United States Patent [19]

Petrella et al.

[11] Patent Number: 4,707,501

[45] Date of Patent: Nov. 17, 1987

[54] POLYURETHANE FOAM CATALYSTS THAT ELIMINATE POLYUREA-CONTAINING POLYOL BASED MASTERBATCH CURE DRIFT

[75] Inventors: Robert G. Petrella, Allentown; Michael Scarpati, Leighton, both of Pa.

[73] Assignee: Air Products and Chemicals, Inc., Allentown, Pa.

[21] Appl. No.: 14,504

[22] Filed: Feb. 13, 1987

[51] Int. Cl.$^4$ ................................................. C08J 9/00
[52] U.S. Cl. ....................................... 521/115; 521/129; 521/159; 528/53; 528/54; 502/167
[58] Field of Search .................... 521/115, 129, 159; 252/182

[56] References Cited

U.S. PATENT DOCUMENTS

| | | | |
|---|---|---|---|
| 3,734,868 | 5/1973 | Uelzmann et al. | 521/115 |
| 3,786,005 | 1/1974 | Bechara et al. | 521/115 |
| 4,040,992 | 8/1977 | Bechara et al. | 260/2.5 AW |
| 4,115,302 | 9/1978 | Mao | 521/115 |
| 4,228,248 | 10/1980 | Zimmerman | 521/115 |
| 4,404,121 | 9/1983 | Klein et al. | 521/115 |
| 4,582,861 | 4/1986 | Galla et al. | 521/118 |
| 4,617,286 | 10/1986 | Arai et al. | 521/115 |

Primary Examiner—Morton Foelak
Attorney, Agent, or Firm—Michael Leach; James C. Simmons; William F. Marsh

[57] ABSTRACT

In the preparation of a high resiliency polyurethane foam by reacting a polyisocyanate with a polyurea dispersion-containing polyol based masterbatch composition also containing a tertiary amine catalyst for the polyurethane reaction, the improvement for eliminating cure draft of such stored polyol compositions which comprises employing a catalyst composition consisting essentially of 5 to 15 wt% triethylenediamine,
20 to 35 wt% 4-(2-dimethylaminoethyl) morpholine,
20 to 35 wt% N,N,N',N'-tetramethyl-1,2-diamino-2-methylpropane,
10 to 25 wt% bis(dimethylaminoethyl)ether, and
5 to 40 wt% of an N-hydroxyalkyl quaternary ammonium acid salt.

13 Claims, No Drawings

POLYURETHANE FOAM CATALYSTS THAT ELIMINATE POLYUREA-CONTAINING POLYOL BASED MASTERBATCH CURE DRIFT

TECHNICAL FIELD

This invention relates to the amine catalysis of reactions involving organic polyisocyanates and polyols in the production of polyurethane products.

BACKGROUND OF THE INVENTION

Manufacturers of high resiliency polyurethane foam typically use masterbatches consisting of one or more, usually two, polyols plus silicone surfactant, water, amine catalysts and possibly organometallic salts, blowing agent, crosslinkers, dyes or pigments and flame retardants in the manufacture of automotive seating cushions and backs. These are called the "B" side components. Depending on the size of the individual molding plant, the respective masterbatches may be consumed in as short as 2-4 hours or as long as 4-5 days. One of the typically used polyol masterbatches contains an in-situ made polyurea dispersion (PUD). Masterbatches comprising a polyurea dispersion-containing polyol [PUD polyol] and utilizing an acid blocked amne catalyst package rapidly change in reactivity when used over several days. Typically after several hours storage, this reactivity drift becomes apparent. Accordingly, very large volume users who consume a masterbatch over a 2-4 hour period never exceed the original initiation period whereas low to moderate volume molders generally will consume their masterbatches over 2-4 days experiencing the cure drift problem.

Stoichiometrically, one isocyanate group is required to react with one active hydrogen group in the polyurethane reaction. In practice, a slight excess of the isocyanate is used to react with water to generate carbon dioxide to expand the mixture into a foam. The ratio of isocyanate to active hydrogen is referred to as the "isocyanate index".

Molders typically run between 95–105 isocyanate index in producing their seating foam holding to a preselected level ±one isocyanate index unit. If the index drops significantly below the selected value, the foam is undercured with poor initial and somewhat dminished final physical properties. If the index is greater than about 110, the foam develops a hard "boardy" feel and loses its resiliency. Both results are commercially unacceptable.

When the PUD polyol masterbatch is used, the isocyanate index drops from the selected index value of typically 102±1 to the 80–85 or lower range after 8 hours. In order to maintain uniform production, the polyurethane molders must continuously add more isocyanate to hold the selected index range. This increases the molder's cost to produce commercially acceptable foam.

All polyurethane foamers, regardless of size, require a slight delay of 2–3 seconds in foam initiation to allow the molds to close before the foam rises over the mold part line. Typically, this delay is achieved by using an acid blocked catalyst package.

The PUD polyol supplier recommends to the foam molders that non-acid blocked catalysts be used as a means of ameliorating the PUD polyol masterbatch cure drift. This approach, however, causes the molder other problems. If catalyst levels are used to provide a molded foam piece that is sufficiently cured to remove from the mold without tearing or accepting handling marks on the surface, the foam forming reaction is sufficiently advanced at mold closure to have the fresh rising foam flow over the part line. Also, the mold lid typically contains inserts which are driven into the rising foam during closure inducing stresses and shear collapse. The overflow reduces the physical strength of the resulting foam product and wastes material. The shear collapse also reduces the physical properties, quality and durability of the cured foam product.

The alternate procedure of undercatalyzing the B-side produces undercured parts that lack sufficient integrity to be easily removed from the mold without tearing or accepting surface imprints. If the tear is either large enough or in a critical area, the part must be scrapped. If the tear is minor or in a non-critical area, it can be repaired. However, the molder incurs an economic penalty.

U.S. 4,582,861 discloses a method for preparing polyurethane product by the reaction of an organic polyisocyanate with a polyester or polyether polyol in the presence of a catalytically effective amount of a catalyst system consisting essentially of a tertiary amine and 1-35 wt %, based on the tertiary amine, of an N-hydroxyalkyl quaternary ammonium salt.

SUMMARY OF THE INVENTION

The present invention provides a method for substantially eliminating cure drift in polyurea dispersion containing polyol based masterbatches. High resiliency polyurethane foam is prepared by reacting an organic polyisocyanate component with a masterbatch containing a PUD polyol component which also includes a tertiary amine catalyst for the reaction of the isocyanate with an active hydrogen moiety. The improvement for substantially eliminating the cure drift comprises employing a catalyst composition consisting essentially of (a) 5 to 15 wt % triethylenediamine, (b) 20 to 35 wt % 4-(2-dimethylaminoethyl) morpholine, (c) 20 to 35 wt % N,N,N',N'-tetramethyl-1,2-diamino-2-methyl propane, (d) 10 to 25 wt % bis(N,N-dimethylaminoethyl) ether, and (e) 5 to 40 wt % of a N-hydroxyalkyl quaternary ammonium acid salt prepared by reacting an amine of the formula

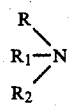

wherein R, $R_1$ and $R_2$ are alkyl or hydroxyalkyl groups of 1–20 carbon atoms, or cycloalkyl groups of 3–8 carbon atoms, aralkyl, aryl, alkenyl groups of 2–20 carbon atoms or alkynyl groups of 2–6 carbon atoms; or R, $R_1$ and $R_2$ together with the nitrogen atom constitute a N-substituted heterocyclic 5–7 atom ring.

with an alkylene oxide of 2–4 carbon atoms in the presence of an acid.

The use of such catalyst composition according to the invention for the manufacture of high resiliency polyurethane foam provides the following advantages:

Sufficient delay in the start of the foam forming reactions to allow the molds to be closed, Impart stability to the rising foam so that the mold is completely filled with good quality foam, Impart sufficient cure to easily remove the foam at the end of the cycle without tearing or surface marring during removal, Maintain a constant reactivity profile obviating the need to constantly adjust the isocyanate index, and Maintain these characteristics over the life of the PUD polyol masterbatch.

DETAILED DESCRIPTION OF THE INVENTION

The preparation of high resiliency polyurethane foam product according to the invention uses the polyisocyanates well known in the art for making such foams including hexamethylene diisocyanate, phenylene diisocyanate, toluene diisocyanate and 4,4'-diphenylmethane diisocyanate. Especially suitable are the 2,4- and 2,6-toluene diisocyanates ("TDI") individually or together as their commercially available mixtures. Other suitable mixtures of diisocyanates are those known commercially as "crude MDI", also known as PAPI. which contain about 60% of 4,4'-diphenylmethane diisocyanate along with other isomeric and analogous higher polyisocyanates. Mixtures of TDI and MDI are especially suitable for use. Also suitable are "prepolymers" of these polyisocyanates comprising a partially prereacted mixture of polyisocyanates and polyether or polyester polyol.

Regarding the polyol component of the "B-side" masterbatch in the preparation of high resiliency polyurethane foam, at least one polyol is a PUD polyol such as Multranol E-9151 marketed by Mobay Chemical Corporation, and other similar PUD polyols well known in the art. In addition, the B-side masterbatch can also contain other polyalkylene ether or polyester polyols typically used to make high resiliency foam. The polyalkylene ether polyols include the poly(alkyleneoxide) polymers such as poly(ethyleneoxide) and poly(propyleneoxide) polymers and copolymers with terminal hydroxyl groups derived from polyhydric compounds including diols and triols, for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylolpropane, cyclohexanediol and like low molecular weight polyols.

Useful polyester polyols include those produced by reacting a dicarboxylic acid with an excess of a diol, for example, adipic acid with ethylene glycol or butanediol, or reacting a lactone with an excess of a diol such as a caprolactone and propylene glycol.

Other typical agents found in high resiliency polyurethane foam formulations include blowing agents such as water, methylene chloride, trichlorofluoromethane and the like, and cell stabilizers such as silicones.

A general high resiliency polyurethane foam formulation would comprise the following:

| HIGH RESILIENCY FOAM FORMULATION | |
|---|---|
| COMPONENT | pbw |
| PUD POLYOL | 20 to 80 |
| POLYETHER POLYOL | 20 to 80 |
| CELL STABILIZER | 1 to 2.5 |
| ORGANOMETALLIC CATALYST | 0 to 0.01 |
| BLOWING AGENT | 0 to 10 |
| INVENTION CATALYST | 0.5 to 1 |
| ISOCYANATE PREPOLYMER, | 95-105 INDEX, 18-22% |
| FREE NCO % | |

The polyol masterbatch, or B-side masterbatch, would comprise the first six listed components. The most important component with regard to substantially eliminating the reactivity drift is the catalyst composition which consists essentially of (a) 5 to 15 wt %, preferably 6 to 12 wt %, triethylenediamine, (b) 20 to 35 wt %, preferably 22 to 32 wt %, 4-(2-dimethylaminoethyl) morpholine, (c) 20 to 35 wt %, preferably 22 to 32 wt %, N,N-dimethyl-N',N'-dimethyl-1,2-diamino-2-methyl propane, (d) 10 to 25 wt %, preferably 10 to 20 wt %, bis(N,N-dimethylaminoethyl) ether, and (e) 5 to 40 wt %, preferably 15 to 35 wt %, of a N-hydroxyalkyl quaternary ammonium salt.

The N-hydroxyalkyl quaternary ammonium salt is prepared by reacting a tertiary amine of the following general formula

wherein R, R$_1$ and R$_2$ are independently alkyl or hydroxyalkyl groups of 1-20 carbon atoms or cycloalkyl groups of 3-8 carbon atoms, aralkyl, aryl, alkenyl groups of 2-20 carbon atoms or alkynyl groups of 2-6 carbon atoms, or R, R$_1$ and R$_2$ together with a nitrogen atom form an N-substituted heterocyclic 5-7 atoms ring structure, examples of which include triethylenediamine, methyltriethylenediamine, quinuclidine, N-methylmorpholine, N-ethylmorpholine, N,N'-dimethylpiperazine and 1,8-diazobicyclo (5,4,0)-undecene-7.

In addition to the heterocyclic amines just mentioned, other suitable tertiary amines for making the quaternary ammonium salt include trimethylamine, dimethylethylamine, N-dimethyl-N-hydroxyethylamine, N-benzyl-N-dimethylamine, bis(N,N-dimethylaminopropyl)-N-methylamine, N-di(hydroxyethyl)-N-phenylamine, triethanolamine, N-cyclohexyl-N-dimethylamine, and bis(dimethylaminoethyl) ether. The preferred tertiary amine is triethylenediamine (TEDA).

The selected tertiary amine is reacted with an alkylene oxide containing 2-22 carbon atoms in the presence of an acid H-A, including inorganic and organic acids.

The alkylene oxides that can be reacted with the tertiary amine can be represented by the general formula

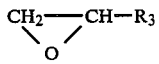

where: R$_3$ is hydrogen, phenyl, an alkyl group of 1-15 carbon atoms, a hydroxyalkyl group of 1-9 carbon atoms or an alkoxyalkyl group having a total of 2-20 carbon atoms.

Among the particular alkylene oxides that can be reacted with the tertiary amine there are included ethylene oxide, propylene oxide, styrene oxide, glycidol and longer chain alkylene oxides. Ethylene oxide and especially propylene oxide are preferred.

It is preferred that any one of a large variety of organic acids represented by the following formula may be used to furnish the anion of the desired N-hydroxyalkyl quaternary ammonium salt:

$$Y-(O)_a-CO_2H$$

where:
a is 0 or 1,
Y is hydrogen, an alkyl group of 1-20 carbon atoms, an alkenyl group of 2-15 carbon atoms, a cycloalkyl group of 3-6 carbon atoms, phenyl, an alkylphenyl group having 1-9 carbon atoms in the alkyl group or groups attached to the phenyl ring, benzyl, an alkylbenzyl having 1-9 carbon atoms in the alkyl group or groups attached to the benzene ring, or a $$-CH_{(3-b)}Z_b \text{ group}$$

where:
b is 1-3 and
Z is —OH, —CN, —Cl, an alkoxy group of 1-5 carbon atoms, a phenyl group or methoxyphenyl group, or
Z is —$(CH_2)_d COOR_4$ wherein d is 0-4 and $R_4$ is hydrogen or an alkyl group of up to 20 carbon atoms.

The preferred quaternary ammonium carbonylate salts for use in the catalyst composition are those in which the acid is an organic carboxylic acid corresponding to the following general formula $R_8-CO_2H$ where $R_8$ is hydrogen, an alkyl group of 1-18 carbon atoms, an alkenyl group of 2-15 carbon atoms, benzyl or $-CH_2CN$.

Organic carboxylic acids of the above formula include short to long chain fatty acids; substituted aliphatic acids and aromatic carboxylic acids. Representative acids include formic, acetic, hexanoic, straight and branched heptanoic, octanoic, decanoic and hexadecanoic acids; neoacids such as 3,3-dimethylbutanoic acid; unsaturated aliphatic acid such as oleic, acrylic, methacrylic, undecenoic; aromatic acid such as benzoic, phenylacetic and salicylic; and cyanoacetic and chloroacetic acids.

The preferred route for the preparation of the hydroxyalkyl quaternary ammonium salts used in the invention is by reaction of the appropriate tertiary amine with an alkylene oxide in the presence of the chosen acid. If the corresponding ammonium compound is commercially available as the hydroxide or alkoxide, formation of the desired salt can be directly obtained by reaction of the quaternary ammonium base with the desired acid.

Preparation of the hydroxyalkyl quaternary ammonium salts is more fully described in U.S. 4,040,992 and 4,582,861 which are incorporated by reference.

In the usual method of preparation of the desired hydroxyalkyl ammonium quaternary salts, equivalent amounts of the tertiary amine, the carboxylic acid and an alkylene oxide are mixed, preferably in the presence of a suitable solvent such as dipropylene glycol, ethylene glycol or 1,4-butanediol. The alkylene oxide may be used in excess amounts ranging from 0 to about 200% excess on a molar basis, especially a 100% molar excess when triethylenediamine is used. The reaction is carried out at a temperature in a range of 25-60° C. and at about atmospheric pressure, although higher pressures may be employed, if desired.

Hydroxypropylated triethylenediamine quaternary salts of formic acid and carboxylic acids having up to about 10 carbon atoms such as those of 2-ethylhexanoic and various decanoic acids are preferred. The preferred hydroxypropylated triethylenediamine quaternary salts are those prepared by reacting triethylenediamine with 2 molar equivalents of the alkylene oxide in the presence of the chosen acid.

In the usual method of preparation, the alkylene oxide is used in excess of equimolar amounts with triethylenediamine, desirably in amounts ranging from 30 to about 200% excess on a molar basis, especially about 100% molar excess.

A catalytically effective amount of the catalyst composition of the invention is used in the high resiliency polyurethane foam formulation. More specifically, suitable amounts of the catalyst composition may range from about 0.1 to 3 parts per 100 parts polyol in the polyurethane formulations.

EXAMPLE 1

The following general procedure for the preparation of the carboxylic acid salt of hydroxypropylated triethylenediamine is essentially as taught in U.S. 4,040,992 except that greater than an equimolar quantity of the alkylene oxide is used.

A suitable amount of glycol solvent is charged to a reaction vessel equipped with a stirrer, dropping funnel, condenser and heating mantle. One mole of the appropriate carboxylic acid (144 g for 2-ethylhexanoic acid) is added. The reaction vessel is surrounded with a cooling bath (about 15° C.) and one mole of the amine (112 g triethylenediamine) is added. The reaction temperature is allowed to reach 25° C. whereupon 2 moles of alkylene oxide (116 g propylene oxide) is added to the reaction mixture. Although the reaction is exothermic, it may be controlled by the slow addition of the alkylene oxide. After all the alkylene oxide has been added, the reaction temperature is maintained at about 40° C. for a period of time, preferably about 30 minutes.

All evaluations of catalyst compositions were done with the following foam formulation:

| FOAM FORMULATION | |
|---|---|
| | pbw |
| MULTRANOL E-9151[a] 28 ± 2 OH # | 50 |
| MULTRANOL E-3901[b] 28 ± 2 OH # | 50 |
| DC-5043[c] | 1.75 |
| UL-1[d] (10% in DOP) | 0.08 |
| WATER | 4.5 |
| MONDUR E-531[e] | VARIOUS INDEXES |

[a] A 6000 mol wt triol containing approximately 22–25 wt % of a polyurea dispersion and having a hydroxyl number of 28 ± 2 marketed by Mobay Chemical Corp.
[b] A 6000 mol wt triol having a hydroxyl number of 28 ± 2 marketed by Mobay Chemical Corp.
[c] A silicone cell stabilizer marketed by Dow Corning Corp.
[d] An organometallic catalyst marketed by Witco Corp.
[e] A blend of toluene diisocyanate and 4,4'-diphenylmethane diisocyanate by Mobay Chemical Corp.

The masterbatch instability (cure drift) was determined by comparing foam made from a fresh masterbatch to foam made from the same masterbatch aged 2 days at 120° F. (48.9° C.) Two days at 120° F. produced essentially equivalent results to masterbatch aged 16 days at ambient temperature. In addition, 120° F. was the highest observed temperature encountered by a mold producer.

The key parameters measured were cream time, top-of-cup and string gel.

"Cream time" is the time in seconds from the start of mixing the catalyzed masterbatch and isocyanate to the onset of rise in the mixture. This parameter is a measure of the time to the commencement of the foaming reaction.

"Top-of-cup" is the time in seconds from the start of mixing the catalyzed masterbatch and isocyanate to the rise of the foam to the top of a 5 quart cup. This parameter is a measure of foam rise rate.

"String gel" is the time in seconds from the start of mixing the catalyzed masterbatch and isocyanate to the time a string of reaction product is pulled from the foam when a rod is placed in the foam and removed. This parameter is a measure of the degree of the polymerization reaction and indicates the resulting foam has developed sufficient strength to maintain its integrity.

An added constraint based on the correlation of hand mixed foams to production requirements is that the cream time must exceed 10 seconds in order to permit the molds to close before the foam overflows the mold cavity part line.

A base catalyst blend (BCB) known to produce commercially acceptable high resiliency foam was used as the comparative starting point. The BCB comprised the following:

| BASE CATALYST BLEND | wt % |
|---|---|
| 4-(2-dimethylaminoethyl) morpholine | 27.3 |
| N,N,N',N'—tetramethyl-1,2-diamino-2-methylpropane | 27.3 |
| Bis(dimethylaminoethyl) ether | 12.7 |
| Triethylenediamine | 9.1 |
| Dipropylene glycol | 23.6 |

EXAMPLE 2

In this example, the BCB was evaluated with various levels of formic acid. (See Table 1). At the lowest levels, the change in cure time after 16 days storage was marginally acceptable (6%), but the initiation occurred too fast to permit mold closure before the foam overflowed the mold. As the formic acid level was increased to achieve the proper delay in foam initiation, the cure drift as shown by Run 2 approached 15% which is totally unacceptable. Run 5 is a commercially used acid blocked catalyst blend that illustrates cure drift.

TABLE 1

| | | | EFFECT OF FORMIC ACID LEVELS AMBIENT TEMPERATURE | | | | | |
|---|---|---|---|---|---|---|---|---|
| | | | INITIATION | | TOP OF CUP | | STRING GEL | |
| | DAYS | | | | | | | |
| RUN | CATALYST | PHP | 0 | 16 | 0 | 16 | 0 | 16 |
| 1 | BCB + 0.088 php FA | 0.85 | 13 | 15 | 62 | 75 | 85 | 94 |
| 2 | BCB + 0.063 php FA | 0.85 | 11 | 13 | 56 | 64 | 78 | 86 |
| 3 | BCB + 0.038 php FA | 0.85 | 10 | 12 | 46 | 54 | 69 | 73 |
| 4 | BCB + 0.0 PHP FA | 0.65 | 9 | 9 | 39 | 39 | 60 | 59 |
| 5 | Dabco ® 8154/ Polycat ® 77/ Dabco BL-11/ Dabco 33LV | 0.70 | 12 | 13 | 53 | 69 | 78 | 95 |

EXAMPLE 3

In this example, the PUD polyol masterbatch containing the BCB with and without acid blocking were evaluated after storage at 120° F. It can be seen from the data in Table 2 that Run 6 and Run 7 in which the BCB containing masterbatch with and without acid blocking, respectively, showed 36 and 23% drift in cure rates, respectively. The same BCB with the acid blocking added to the catalyst composition just before use was mixed with aged masterbatches (Run 8) and exhibited essentially no charge in cure. From this data it can be concluded that acid blocking is not the only cure of the cure change.

TABLE 2

| | | ACCELERATED AGING STUDY 120° F. | | | | | | | | | | |
|---|---|---|---|---|---|---|---|---|---|---|---|---|
| | | INITIATION (SEC) | | | | TOP OF CUP (SEC) | | | | STRING GEL (SEC) | | | |
| RUN | DAYS AT 120° F. | 0 | 2 | 4 | 8 | 0 | 2 | 4 | 8 | 0 | 2 | 4 | 8 |
| 6 | BCB + 12% FA | 15 | 14 | 13 | 14 | 64 | 93 | 92 | 93 | 90 | 123 | 122 | 122 |
| 7 | BCB W/O ACID | 9 | 11 | 10 | 10 | 36 | 46 | 45 | 45 | 56 | 69 | 67 | 64 |
| 8 | BCB (ACID POST ADDED) | 9 | 9 | 9 | 9 | 37 | 38 | 42 | 40 | 58 | 57 | 64 | 59 |

This example shows the results obtained using the BCB with 30% of various N-hydroxypropyl quaternary ammonium salts. It can be seen from the data in Table 3 that incorporation of an amount of an N-hydroxypropyl quaternary ammonium salt yielded sufficient delay in cream time. In fact, the use of a quaternary ammonium product from the reaction of TEDA (1 mole), propylene oxide (2 moles) and 2-ethylhexanoic acid (1 mole) in combination with the BCB provided a catalyst system in which the initiation tion was sufficiently delayed to permit the mold to be closed without overflowing and significantly retarded the masterbatch cure drift.

TABLE 3

| RUN | CATALYST | PHP | AMBIENT TEMPERATURE | | | | | |
|---|---|---|---|---|---|---|---|---|
| | | | INITIATION | | TOP OF CUP | | STRING GEL | |
| | | | DAYS 0 | 16 | 0 | 16 | 0 | 16 |
| 9 | BCB + .23 MOLES FA | 0.85 | 13 | 15 | 62 | 75 | 85 | 94 |
| 10 | BCB + NTQ1 | 0.68 | 10 | 12 | 54 | 70 | 78 | 95 |
| 11 | BCB + NTQ2 | 0.68 | 11 | 14 | 49 | 65 | 68 | 85 |
| 12 | BCB + NTQ3 | 0.68 | 10 | 11 | 47 | 56 | 70 | 76 |

NTQ1 is the reaction product of trimethylamine, propylene oxide and cyanoacetic acid in equimolar amounts.
NTQ2 is the reaction product of dimethylethanolamine, propylene oxide and formic acid in equimolar amounts.
NTQ3 is the reaction product of 1 mole TEDA, 2 moles propylene oxide and 1 mole 2-ethylhexanoic acid as a 50% solution in ethylene glycol.

EXAMPLE 5

In this example, the catalyst of Run 12 was reformulated so that two parts of BCB was used in combination with one part of the hydroxypropyl quaternary ammonium salt in an accelerated aging test. Again, it can be seen from the data in Table 4 that this particular combination of active components (Run 14) provides a catalyst composition eminently suited for PUD polyol masterbatches. Run 15 shows a commercial catalyst blend for high resiliency foam. Although Run 15 appears to solve the cure drift problem, the total cure time for the finished product (not shown in Table 4) was deficient compared to Run 14.

TABLE 4

| RUN | CATALYST | PHP | ACCELERATED AGING AT 120° F. | | | | | |
|---|---|---|---|---|---|---|---|---|
| | | | INITIATION | | TOP OF CUP | | STRING GEL | |
| | | | DAYS 0 | 16 | 0 | 16 | 0 | 16 |
| 13 | BCB + .23 MOLES FA | 0.85 | 13 | 13 | 56 | 70 | 76 | 96 |
| 14 | 2 BCB + 1 NTQ3 | 0.60 | 10 | 11 | 53 | 58 | 74 | 84 |
| 15 | Polycat 77/ NIAX A-4/ DABCO BL-11 | 0.50 | 10 | 11 | 56 | 62 | 82 | 86 |

Thus, the invention provides a catalyst composition for a masterbatch that reacts uniformly over its existence, namely 2-4 days. The catalyst composition works because it (a) delays the initiation of the foam forming reactions sufficiently to permit mold closure without the foam spilling over the sides of the bottom half of the mold.

(b) maintains the stability of the rising foam in the mold as it flows through the internal restrictions, (c) produces a sufficient degree of cure throughout the foam to permit removal without tearing or accepting finger printing on the surface, (d) maintains a constant reactivity profile so that the operator does not have to constantly adjust the amount of isocyanate to be added to achieve the desired final physical properties, and (e) maintains these characteristics over the life of the masterbatch.

STATEMENT OF INDUSTRIAL APPLICATION

The invention provides a catalyst composition for polyurea dispersion-containing polyol masterbatches in the preparation of high resiliency polyurethane foam which inhibits the loss in reactivity of the masterbatch with storage.

We claim:

1. In a method for preparing a high resiliency polyurethane foam by the reaction of a polyisocyanate with a polyurea dispersion-containing polyol based masterbatch composition also containing an amine catalyst for the polyurethane reaction, the improvement which comprises employing as the catalyst a composition consisting essentially of (a) 5 to 15 wt % triethylenediamine,
(b) 20 to 35 wt % 4-(2-dimethylaminoethyl) morpholine,
(c) 20 to 35 wt % N,N,N',N'-tetramethyl-1,2-diamino-2-methylpropane,
(d) 10 to 25 wt % bis(N,N-dimethylaminoethyl) ether, and
(e) 5 to 40 wt % of a N-hydroxyalkyl quaternary ammonium acid salt prepared by reacting an amine of the formula

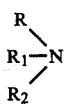

where

R, $R_1$ and $R_2$ are independently alkyl or hydroxyalkyl alkyl groups of 1-20 carbon atoms, cycloalkyl groups of 3-8 carbon atoms, aralkyl, aryl, alkenyl groups of 2-20 carbon atoms or alkynyl groups of 2-6 carbon atoms, or R, $R_1$ and $R_2$ together with a nitrogen atom form an N-substituted heterocyclic 5-7 atoms ring structure, with an alkylene oxide having 2-22 carbon atoms in the presence of an acid.

2. The method of claim 1 in which R, $R_1$ and $R_2$ are independently alkyl or hydroxyalkyl groups of 1-20 carbon atoms.

3. The method of claim 1 in which the amine used in preparing the N-hydroxyalkyl quaternary ammonium acid salt is triethylenediamine.

4. The method of claim 1 in which the amine used in preparing the N-hydroxyalkyl quaternary ammonium acid salt is dimethylethanolamine.

5. The method of claim 1 in which the amine used in preparing the N-hydroxyalkyl quaternary ammonium acid salt is trimethylamine.

6. The method of claim 1 in which the alkylene oxide is ethylene oxide or propylene oxide.

7. The method of claim 1 in which the acid is formic acid.

8. The method of claim 1 in which the acid is cyanoacetic acid.

9. The method of claim 1 in which the acid is 2-ethylhexanoic acid.

10. In a method for preparing a high resiliency polyurethane foam by the reaction of a polyisocyanate with a polyurea dispersion-containing polyol based masterbatch composition also containing an amine catalyst with the polyurethane reaction, the improvement which comprises employing as the catalyst a composition consisting essentially of
   (a) 6 to 12 wt % triethylenediamine,
   (b) 22 to 32 wt % 4-(2-dimethylaminoethyl) morpholine,
   (c) 22 to 32 wt % N,N,N',N'-tetramethyl-1,2-diamino-2-methylpropane,
   (d) 10 to 20 wt % bis(N,N-dimethylaminoethyl ether, and
   (e) 15 to 35 wt % of a N-hydroxyalkyl quaternary ammonium acid salt prepared by reacting triethylenediamine with ethylene oxide or propylene oxide in the presence of an organic carboxylic acid of the formula R where $R_8CO_2H$ where $R_8$ is hydrogen, an alkyl group of 1–18 carbon atoms, an alkenyl group of 2–15 carbon atoms, benzyl or —$CH_2CN$.

11. The method of claim 10 in which propylene oxide is used in the preparation of the N-hydroxyalkyl quaternary ammonium salt.

12. The method of claim 11 in which 2 moles of triethylenediamine is reacted with 1 mole of propylene oxide in the presence of 1 mole of an organic carboxylic acid.

13. The method of claim 12 in which the organic carboxylic acid is 2-ethylhexanoic acid.

* * * * *